United States Patent [19]

Kitahara et al.

[11] Patent Number: 4,900,958
[45] Date of Patent: Feb. 13, 1990

[54] DRIVE MOTOR FOR MAGNETIC DISKS, OPTICAL DISKS, AND MAGNETO-OPTICAL DISKS

[75] Inventors: Haruo Kitahara, Nagano; Takeshi Ohshita, Ina, both of Japan

[73] Assignee: Shinano Tokki Corporation, Japan

[21] Appl. No.: 223,895

[22] Filed: Jul. 25, 1988

Related U.S. Application Data

[63] Continuation-in-part of Ser. No. 106,626, Oct. 6, 1987, Pat. No. 4,760,298.

[51] Int. Cl.$^4$ .......................... H02K 5/16; H02K 7/08
[52] U.S. Cl. .................................. 310/67 R; 310/90; 360/98.06; 384/517
[58] Field of Search ................ 310/67 R, 89, 90, 254, 310/261; 360/198.6; 384/512, 571

[56] References Cited

U.S. PATENT DOCUMENTS

| | | | |
|---|---|---|---|
| 4,554,473 | 11/1985 | Müller | 310/67 R |
| 4,672,250 | 6/1987 | Seitz | 310/67 R |
| 4,737,673 | 4/1988 | Wrobel | 310/67 R |
| 4,760,298 | 7/1988 | Kitahara et al. | 310/67 R |
| 4,760,299 | 7/1988 | Dickie et al. | 310/89 |

*Primary Examiner*—Patrick R. Salce
*Assistant Examiner*—D. L. Rebsch
*Attorney, Agent, or Firm*—Welsh & Katz, Ltd.

[57] ABSTRACT

A motor for rotating a magnetic disk, an optical disk, or a magneto-optical disk comprises an armature concentrically secured to a center shaft affixed to the base frame of a disk drive unit. A rotor frame is rotatably supported in a cantilever fashion on a free end of the center shaft by a pair of bearings. The rotor frame is cup-shaped with a depending cylindrical sidewall encircling the outer peripheral surface of the armature. The sidewall includes a disk support that projects outwardly from the sidewall. A permanent magnet secured inside the sidewall interacts with magnetic fields produced by the armature. The cantilever support makes it easier to bring armature leads through a hole in the mounting frame as a part of the manufacturing process.

In an alternate embodiment, the center shaft is shortened so that the lower bearing on the shaft rests upon the frame. The cup-shaped rotor is mounted on the bearings with a hub having a depending cylindrical wall mounted on the lower bearing. The frame has an upstanding cylindrical wall encircling the depending cylindrical wall of the hub. The armature is mounted on the outer surface of the upstanding wall so that it encircles the lower bearing. This embodiment has a short axial length which produces a compact motor.

50 Claims, 10 Drawing Sheets

DRIVE MOTOR FOR MAGNETIC DISKS, OPTICAL DISKS, AND MAGNETO-OPTICAL DISKS

CROSS-REFERENCE TO RELATED APPLICATION

This patent application is a continuation-in-part application of a copending application entitled "Motor for Driving a Magnetic Disk Having a Cup-Shaped Rotor", and having Serial No. 106,626 with a Filing Date of Oct. 6, 1987, now U.S. Pat. No. 4,760,298.

BACKGROUND OF THE INVENTION

This invention relates to a motor for rotating a magnetic disk. In particular, it relates to a motor which is used for an application in which center portions of a few magnetic disks, each normally formed with a magnetic layer on an aluminum disk, are secured to a rotor frame of the motor, and data is recorded on and reproduced from the magnetic disks by magnetic heads disposed near the upper and lower surfaces of each magnetic disk. In addition, the motor is suitable for rotating optical disks and magneto-optical disks.

FIG. 4 is a longitudinal sectional view showing a conventional structure of a motor for rotating and driving a magnetic disk. In FIG. 4, an upright hollow shaft 2 is formed in the center of a circular mounting frame 1 made by aluminum die casting or the like. A motor 3 has a hollow fixed shaft 4 that is pressed onto the upright hollow shaft 2. A laminated core 6 of an armature 5 is pressed and secured to an axial central portion of the hollow fixed shaft 4. Shoulders 7 are defined on both ends of the hollow fixed shaft 4 to form small diameter portions 8 and 9. Lower portion 8 is slightly longer in the axial direction than upper portion 9 in order to accommodate two Belleville springs 10 that are inserted onto the lower small diameter portion 8. Springs 10 exert force on a lower roller bearing 11 that is inserted on portion 8. An upper roller bearing 14 is pressed onto portion 9 and confined between the upper portion 9 and an end plate 13 of a rotor frame 12, so that the frame 12 may be rotatably supported by bearings 11 and 14 on the hollow fixed shaft 4. The rotor frame 12 is in the shape of a cup. An axial cylindrical side wall 54 covers an outer peripheral surface of the armature 5, and an outer end of the side wall 54 serves as a magnetic disk support 15 which is projected outwardly perpendicular to the motor axis. Support 15 is opposed to the mounting frame 1, thereby leaving a small clearance. An annular recess 16 formed at an inner corner of the magnetic disk support 15 is provided for a good contact between the magnetic disk support 15 and a magnetic disk placed thereon.

An annular permanent magnet 17 having the desired number of poles is pressed and secured into the cylindrical side wall 54, after which an end plate 19 is pressed and secured to the roller bearing 11. The roller bearing 11 is then pressed and secured to shaft 4, and the end plate 19 is attached to the end of the side wall 54 to form a rotor 20. The rotor 20, the armature 5 and the hollow fixed shaft 4 comprise the motor 3. A set of lead wires 22 of an armature coil 21 is drawn out of a hole 23 provided in the hollow fixed shaft 4 and pulled into the hollow portion of shaft 4. The wires are then pulled outside of the motor through the hollow portion of the hollow shaft 2.

FIG. 5 is a sectional view of a portion of the conventional magnetic disk drive motor having the structure described above. In FIG. 5, center holes of the magnetic disks 24 are fitted on the side wall 54 of the rotor frame 12, placed on the disk receiving base 15 in a predetermined spaced relation with spacers 25, and secured by means of a pressure plate 26 and a screw 27. In order to maintain a predetermined small clearance between the surface of each magnetic disk 24 and a radially moving magnetic head 28, vibrations resulting from rotation of the side wall 54 and magnetic external disk support 15 have to be minimized. Further, the width of vertical variation of the rotating disk support 15 should be 0.005 mm or less.

However, in the aforementioned conventional construction, it is very difficult to make the lateral hole 23 through which the lead wires 22 pass in the hollow fixed shaft 4, and the number of parts is large, which increases the cost of the motor.

SUMMARY OF THE INVENTION

It is an object of the present invention to provide a motor having a cup shaped rotor, suitable for driving a magnetic disk, an optical disk, and a magnetooptical disk, which is designed so that the armature is secured to a mounting frame and a lead wire of the armature coil may be drawn out of a hole formed in the mounting frame, thereby reducing the cost of constructing the motor.

In one embodiment of the present invention, an armature is secured concentrically to a center shaft secured integrally on a mounting frame. A rotor frame having a cylindrical side wall of uniform outside diameter is rotatably supported in a cantilever fashion on a free end of the center shaft by means of a pair of ball bearings which encircle the outer peripheral surface of the armature. A disk support projects from said side wall, and a permanent magnet is secured inside the side wall and opposed to the outer peripheral surface of the armature, leaving an air gap.

In this embodiment of the invention, the rotor frame is supported rotatably and in a cantilever fashion on the center shaft to which is secured the armature by means of a pair of ball bearings. Therefore, even if the side wall of the rotor frame is extended so as to cover the outer periphery of the armature, no side run-out relative to the armature occurs and the rotor rotates freely. Accordingly, a disk mounted on the rotor frame may be rotated accurately without side runout or the like. In addition, since the motor is not provided with an end plate on the side of the mounting frame to encircle the armature, there are fewer parts, and the coil lead wire may be drawn outside the frame through a hole formed in the mounting frame, thus materially simplifying the construction of the whole motor.

According to a second embodiment of the present invention, a cup-shaped rotor includes an armature secured concentrically to a center axial pipe secured to a mounting frame. A rotor frame having a cylindrical side wall of uniform outside diameter is rotatably supported in a cantilever fashion on a center shaft pressed and secured to a center hole of a free end of the center axial pipe by means of a pair of ball bearings. A disk support is secured to the side wall, and a permanent magnet is secured inside the side wall and opposed to the outer peripheral surface of the armature, leaving an air gap.

In this embodiment of the invention, the structure is similar to that of the first embodiment except that the rotor center shaft is pressed on and secured to the central axial pipe on the mounting frame. If the pressed length is great and the pressing accuracy is good, this embodiment has the same advantages as the first embodiment. If the mounting frame and the center axial pipe are integrally formed by aluminum die casting, the manufacturing cost is less.

In the disk drive motor of the prior art, as shown in FIG. 4, and in the embodiments of the invention which have been defined hereinabove, the armature is secured concentrically to a center shaft which is secured integrally on a mounting frame. That is to say, the motor must be mounted by means of the mounting frame onto the base frame on the disk drive apparatus. It is within the scope of the present invention to eliminate the mounting frame and provide a disk drive motor wherein the center shaft is secured integrally on the base frame of the disk drive apparatus itself.

In such an embodiment, the motor has a frame having a planar bottom member with upstanding sidewalls. An upstanding shaft integral on the planar bottom member is spaced from the side walls a distance greater than the radius of the magnetic or optical disks. An aperture is provided in the planar bottom member adjacent the upstanding shaft. A core is mounted on the upstanding shaft proximate to the planar bottom member and a winding is mounted on the core to provide an armature which is energizable by receiving electrical energy from lead wires passing to the armature through the aperture. A pair of spaced apart bearings are mounted on the upstanding shaft above the armature and a cup-shaped rotor is mounted on the bearings. This allows the rotor to rotate about the upstanding shaft and the armature. The rotor has a cylindrical open bottom encompassing the armature and it includes a disk support means for mounting disks on the rotor in a plane perpendicular to the axis of the upstanding shaft. A plurality of permanent magnets is mounted within the cup-shaped rotor proximate to and spaced from the armature in magnetic engagement, whereby the rotor rotates about the upstanding shaft and the armature when the armature is electrically energized.

In a further embodiment of the present invention the disk drive motor has an axial length which is highly foreshortened so that it can be used where space limitations require the use of a compact motor. This invention comprehends a motor having a frame with a planar bottom member, an upstanding shaft on the planar bottom member, and an aperture in the planar bottom member. Upper and lower spaced apart bearings are mounted on the upstanding shaft proximate the planar bottom member, and a cup-shaped rotor having a central hub is mounted on the bearings to allow the rotor to rotate about the upstanding shaft. The central hub includes a depending cylindrical wall portion which is mounted on the lower bearing. An upstanding cylindrical wall on the planar member is spaced from and encircles the depending cylindrical wall portion of the rotor central hub, and a core is mounted on the outside surface of this upstanding cylindrical wall. A winding is mounted on the core to provide an armature which is energizable by receiving electrical energy from lead wires passing to the armature through the aperture. The cup-shaped rotor also has a depending outer cylindrical wall which is spaced from and encircles the armature. A plurality of permanent magnets is mounted on the inside surface of this rotor outer cylindrical wall proximate to and spaced from the armature in magnetic engagement, whereby the rotor rotates about the upstanding shaft and the armature when the armature is energized.

A clearer understanding of the present invention will be obtained from the disclosure which follows when read in light of the accompanying drawings.

DESCRIPTION OF THE PREFERRED EMBODIMENTS

Figure 1:
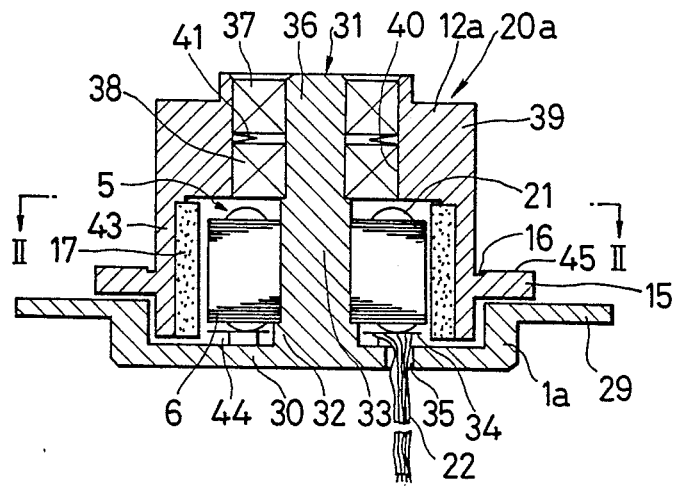
FIG. 1 is a longitudinal sectional view of one embodiment of the present invention.
Figure 4:
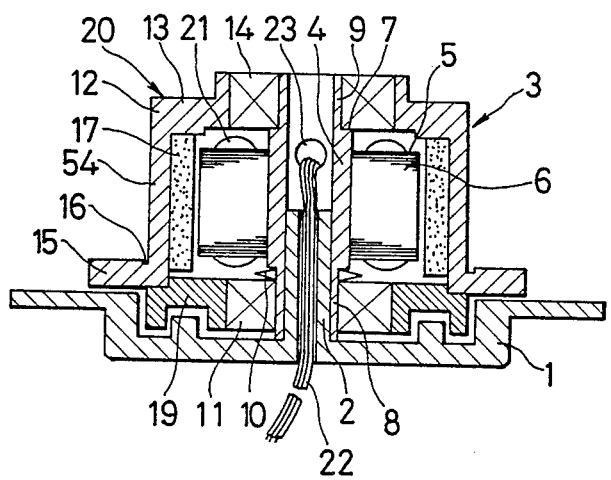
FIG. 4 is a longitudinal sectional view of a motor of the prior art.
Figure 5:
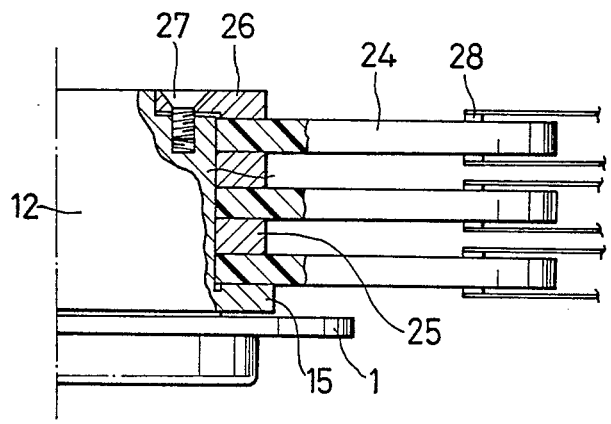
FIG. 5 is a partial sectional elevational view of a rotor of the prior art with magnetic disks mounted thereon.

FIG. 1 is a longitudinal sectional view of an embodiment of the invention in which parts which are the same as those shown in FIG. 4 are indicated by the same reference numerals.

In FIG. 1, a circular mounting frame 1a has a center shaft 31 in the center of a dished portion 30, and projecting outwardly from the dished portion 30 is a flange 29. The frame 1a is preferably formed of steel. A laminated core 6 of an armature 5 is pressed on and secured to a middle-diameter portion 33 which abuts a lower large-diameter portion 32 at the base of the center shaft 31. The core 6 is placed in contact with the large-diameter portion 32, and lead wires 22 connected to an armature coil 21 through a printed-circuit board 34 are taken through a hole 35 formed in the dished portion 30.

The center shaft 31 is formed at its free end with a small-diameter portion 36, on which are pressed and glued or cemented the inner seats of a pair of ball bearings 37 and 38. The inner seat of the bearing 38 is brought into contact with the middle-diameter portion 33, leaving a small clearance between the bearings 37 and 38.

A steel rotor frame 12a constituting a rotor 20a is formed into a cup shape. An outer seat of the bearing 38 is pressed into and glued or cemented to a center hole 40 of a thick-wall portion 39 corresponding to the bottom of the cup. The outer seat of the bearing 37 is fitted loosely in the center hole 40. Two stacked Belleville springs 41 are compressed and interposed with appropriate pre-loading between the outer seats of the bearings 37 and 38 so that the outer seat of the bearing 37 is moved slightly in an axial direction to remove play in both axial and radial directions of the bearings 37 and 38. A cylindrical side wall 43, which is a uniform diameter extension of the thick-wall portion 39, is extended into a recess 44 of the dished portion 30 covering the outer peripheral surface of the core 6. An annular permanent magnet 17 is fitted on the inner surface of the side wall 43 in a face-to-face relation with an iron core 6 leaving an air gap. A magnetic disk support 15 is provided as a projection on the upper surface of the side wall 43 adjacent to the outer surface of the flange 29. The magnetic disk support 15 has an upper surface 45 perpendicular to the center shaft 31. An annular recess 16 is formed at the inner end of the surface 45.

Figure 2:
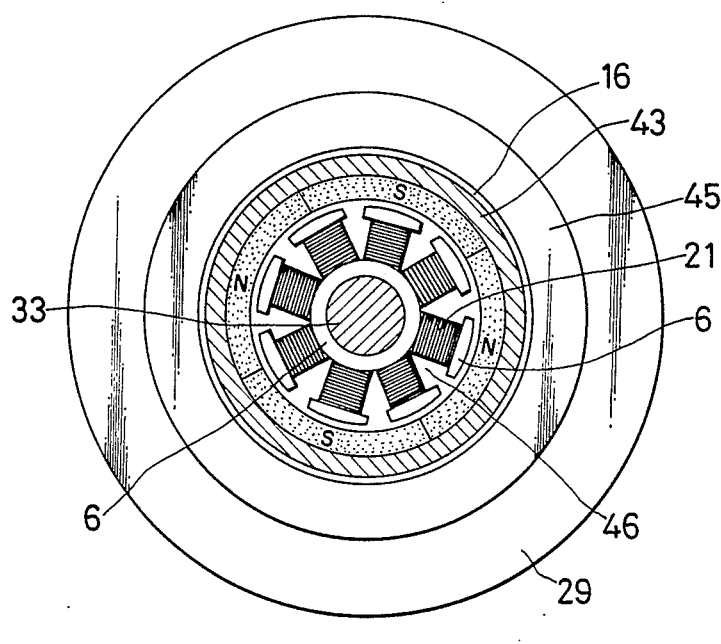
FIG. 2 is a sectional view taken on line II-II of FIG. 1.

The armature 5 has a coil 21 wound within a slot 46 provided in the core 6, as shown in FIG. 2, that can be energized so as to generate rotating fields that interact with those of the permanent magnet 17 to produce torque, causing the rotor 20a to rotate in the same direction as that of the rotating field. The rotor 20a is closely supported on the center shaft 31 by the bearings 37 and 38, and the thick-wall portion 39 firmly supports rotational parts such as the side wall 43 extending therefrom, the permanent magnet 17, the disk support 15 and the magnetic disk fixed on the support 15, thus providing an accurate rotation without rotation runout.

Figure 3:
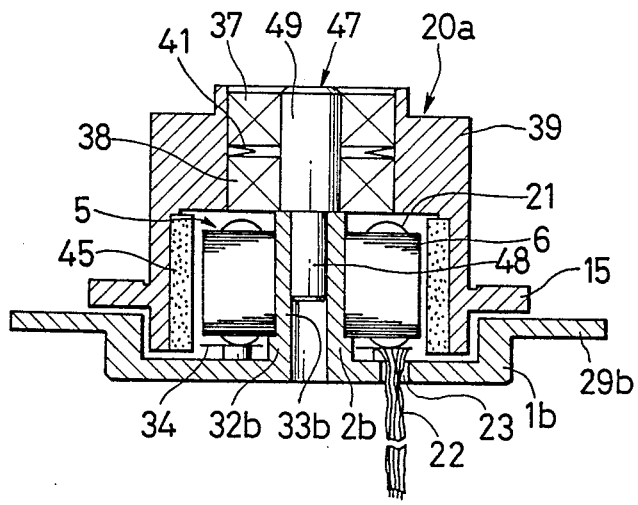
FIG. 3 is a longitudinal sectional view of an alternate embodiment of the invention.

FIG. 3 is a longitudinal sectional view of an alternate embodiment of the invention, in which parts indicated by the same reference numbers as those used in FIGS. 1 and 4 have the same construction as those shown therein, and parts different in construction from those shown in FIG. 4 are indicated by reference numerals with a letter "b" attached thereto. A circular dish-like mounting frame 1b is formed integral with a center axial pipe 2b projected in the central portion by aluminum die casting. A laminated core 6 of an armature 5 is placed in contact with a large-diameter portion 32b and is pressed and secured to a middle diameter portion 33b that abuts to a lower large-diameter portion 32b at the base of the center axial pipe 2b. A mechanism for bringing out lead wires of an armature coil 21 is similar to that shown in FIG. 1.

A small-diameter portion 48 of a steel center shaft 47 is pressed and secured into a center hole formed in a free end of the center axial pipe 2b, and a large diameter portion 49 is brought into contact with the end of the center axial pipe 2b. The small-diameter portion 48 is long enough so that the small-diameter portion 48 maintains alignment of center shaft 47 with the center axial pipe 2b. The wall thickness of the center axial pipe 2b is great enough to withstand the force used to press fit the small diameter portion 48 and also to minimize rotational vibrations of the rotor 20a.

The structure of the rotor 20a mounted on the large-diameter portion 49 is exactly the same as that shown in FIG. 1, and the ball bearings 37 and 38 are mounted in a manner similar to that shown in FIG. 1.

Although they are not shown in FIGS. 1 and 3, Hall elements to detect a rotational position of the permanent magnet 17 are mounted on the mounting frames 1a and 1b, and a detection signal therefrom controls the electrical energy supplied to the armature coil 21 to generate a rotating field.

As described above, according to the present invention, two ball bearings are provided on one side of the rotor to support the rotor 20a in a cantilever fashion. Therefore, the lead wires of the armature coil may be brought out of the hole 35 of the circular mounting frame 1b directly without passing through the center shaft, thus making assembly of the motor simple as compared to the prior art. Also, an end plate for mounting one bearing can be eliminated to greatly reduce the cost.

As noted hereinabove, the mounting frames 1a of FIG. 1 and 1b of FIG. 3 are intended to be secured to the base frame of the disk drive apparatus unit. In the embodiments which are presented in FIGS. 6–14, the mounting frames 1a and 1b are eliminated and the disk drive motor is mounted on an upstanding shaft which is an integral part of the base frame of the disk drive unit itself. Thus, the whole structure may be simplified, and the assembly work may be easier, since the motor may be assembled directly within the disk drive apparatus itself.

Figure 6:
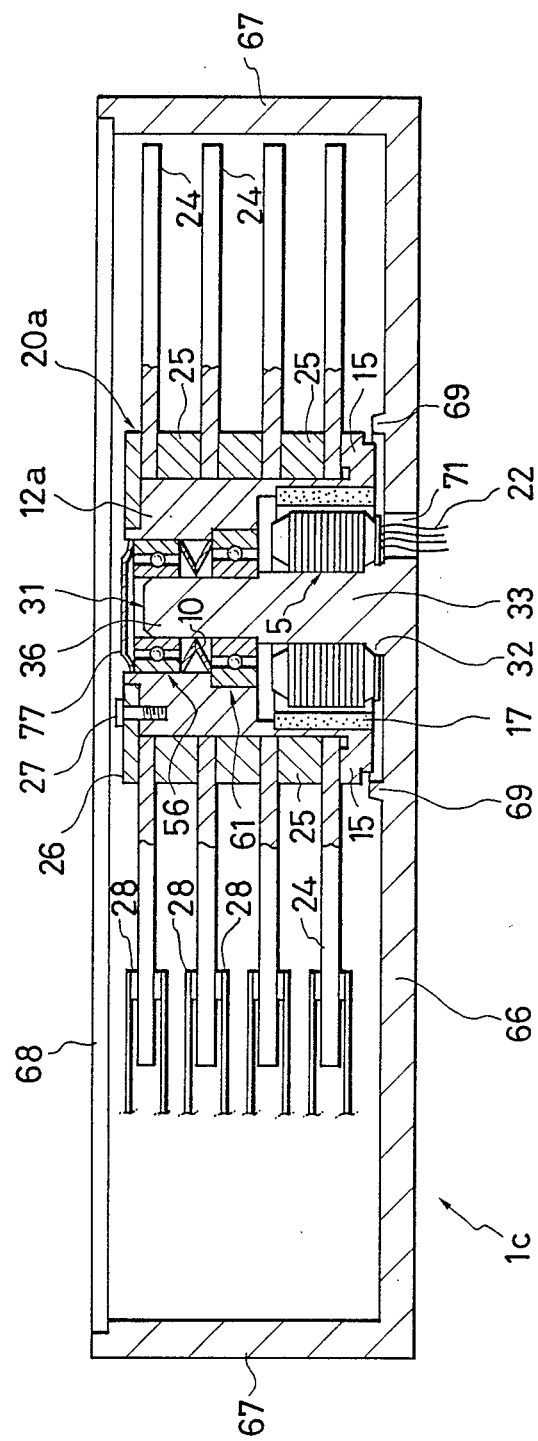
FIG. 6 is a longitudinal sectional view of a further alternate embodiment of the present invention.

Referring now to FIG. 6, there is shown the basic motor which is disclosed in the embodiment of FIG. 1. This motor has a frame 1c which is the base frame of the entire disk drive apparatus unit. Frame 1c has a planar bottom member 66, side walls 67, and a cover plate 68. In this structure of the disk drive unit, the center shaft 31 is shown having the same construction as disclosed in FIG. 1. Shaft 31 has a small diameter upper portion 36, a middle diameter center portion 33, and a large diameter upper portion 32. The center shaft 31 is integrally mounted on the planar bottom member 66. The planar bottom member also has an aperture 71 through which lead wires 22 are passed to the armature 5. The planar bottom member additionally has a circular rib 69 which forms a dish-like pocket around the center shaft 31.

Upper portion 36 of the center shaft 31 has a lower bearing 61 and an upper bearing 56 mounted thereon. The bearings are separated by Belleville springs 10. The cup-shaped rotor 20a is mounted on the bearings 56, 61 and is thereby rotatable on the center shaft. Projection 15 from the cup-shaped rotor frame 12a has a plurality of magnetic disks 24 mounted thereon. These magnetic disks are separated by the spacers 25 and they are read by the magnetic heads 28. Permanent magnets 17 are mounted on the inside surface of the rotor frame 12a in a position opposite to the armature 5 and spaced therefrom. Also mounted on the rotor frame 12a is a pressure plate or holddown plate 26 which secures the magnetic disks 24 and the spacers 25 on the cup shaped rotor. The holddown plate 26 is secured to the rotor frame 12a by means of a plurality of screws 27, only one of which is shown. A cap 77 covers the center shaft 31 and the bearings in order to protect the bearings from atmospheric dust.

Figure 7:
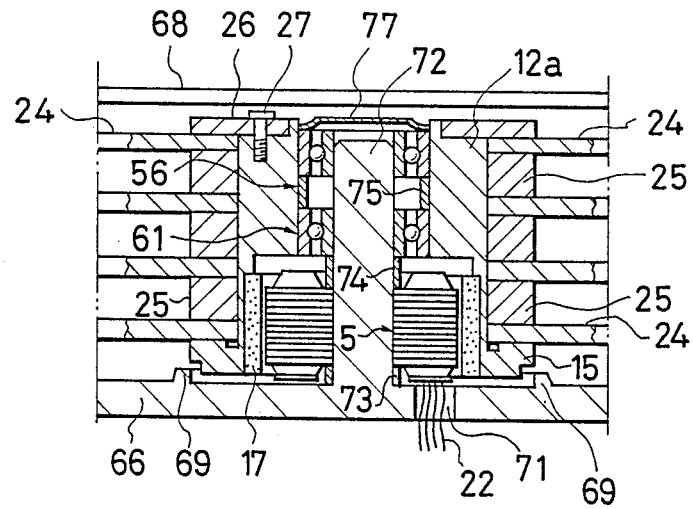
FIG. 7 is a longitudinal sectional view showing a portion of the structure FIG. 6 wherein an alternate form of the motor shaft is shown.

FIG. 7 shows a further embodiment of the apparatus of FIG. 6. Elements which have been shown in FIG. 6 are also shown in FIG. 7. The difference between these two embodiments is that the embodiment of FIG. 7 has a center shaft 72 mounted on the planar member 66 which has a constant diameter. The armature 5, the lower bearing 61 and the upper bearing 56 are mounted on this constant diameter shaft and are separated appropriately by means of spacers. A bottom spacer 73 resting upon the upper surface of the planar member 66 provides the support for the armature 5. A spacer element 74 is mounted on the armature 5 and in turn supports the lower bearing 61. A spacer 75 is mounted on the top of the lower bearing 61 and in turn supports the upper bearing 56.

Figure 8:
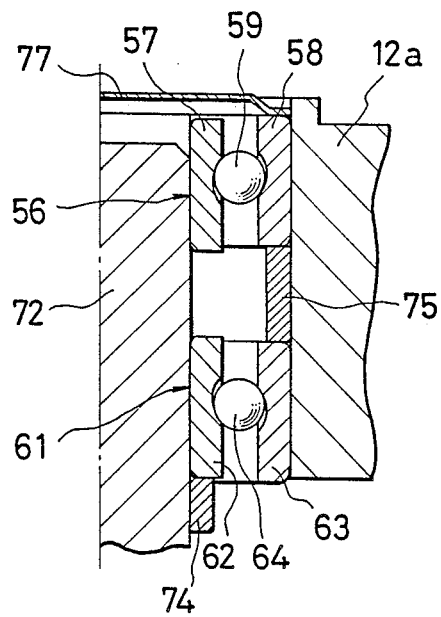
FIG. 8 is an enlarged longitudinal sectional view of a portion of FIG. 7 showing means for positioning the motor bearings in greater detail.

FIG. 8 is an enlargement of a portion of FIG. 7 wherein the bearings are shown more clearly. FIG. 8 shows the upper portion of the center spacer 74 supporting the inner race 62 of the lower bearing 61. The outer race 63 is mounted on the inner surface of the rotor frame 12a and the inner race 62 is mounted on the center shaft 72. These races are mounted on the center shaft and the rotor frame by a press fit or they may be adhesively secured. An epoxy cement is suitable for adhesively securing the races of the ball bearing. The upper ball bearing is supported by a spacer 75 confined between the lower ball bearing 61 and the upper ball bearing 56. It will be seen in FIG. 8 that the lower ball bearing 61 has its inner race 62 elevated slightly above the outer race 63. In a similar manner the upper bearing 56 has its inner race 57 depressed slightly below the outer race 58. This difference in the alignment of the inner and outer races causes the bearing balls 59 of upper bearing 56 and the bearing balls 64 of the lower bearing 61 to be more tightly held within the races. By thus reducing the play in the bearings, this preloading of the bearings minimizes vibration of the rotor when the motor is running.

Figure 9:
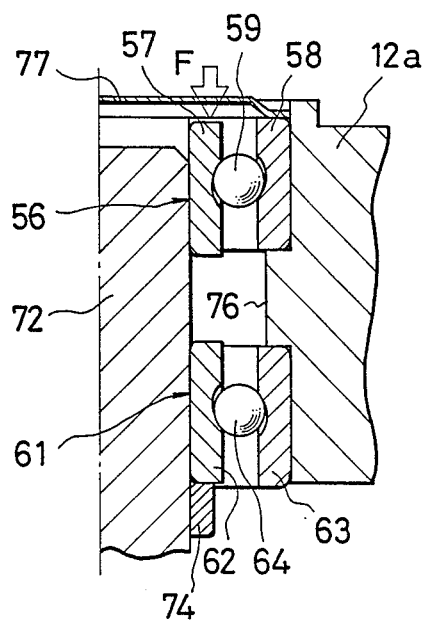
FIG. 9 is an enlarged longitudinal sectional view similar to FIG. 8, but showing alternate means for positioning the motor bearings.

FIG. 9 illustrates an alternate embodiment wherein the spacer 75 has been eliminated. In this embodiment a projection or stepped portion 76 on the inner surface of rotor frame 12a is used to separate the bearings 56 and 61.

FIG. 9 also illustrates the means by which the bearings may be preloaded in order to minimize vibration. The bearings may be adhesively secured on the rotor surface 12a and on the center shaft 72. An epoxy resin adhesive is suitable. When the bearings have been placed in position, an external force F is applied to the inner race 57 of the upper bearing to misalign the inner race 57 from the outer race 58. This force is held while the adhesive cures to secure the races on the surface of the shaft 72 and the rotor 12a. When the adhesive has set, the external force is released and the permanent misalignment of the races has imparted a preloading to the upper bearing. Similarly, while external force F is being applied to the upper bearing 56, an internal reaction force is being responsively applied to the lower bearing 61 by the middle spacer 74 to thereby cause a permanent misalignment of the inner race 62 from the outer race 63 in the lower bearing. This provides the preloading of the lower bearing.

Figure 10C:
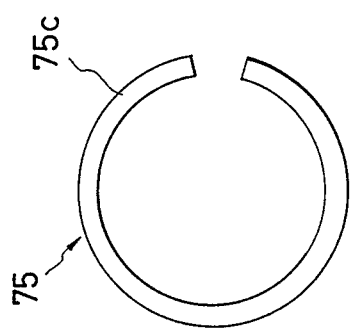
FIGS. 10A, 10B and 10C are plan views of alternate embodiments of the bearing spacer for the inventive motor.
Figure 10B:
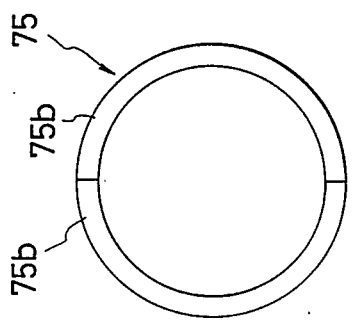
Figure 10A:
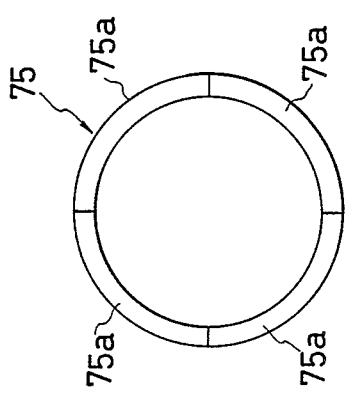

The spacers 73, 74 and 75 are annular rings but they may be segmented annular rings. This concept is illustrated in FIGS. 10A, 10B, and 10C wherein the spacer 75 is shown for purposes of illustration. In FIG. 10A, spacer 75 is shown to have four segments 75a, each defining a quarter of a circle. In FIG. 10B, the spacer 75 is shown as having two segments 75b which are a half circle having a C-shape. In FIG. 10C, the spacer 75 is shown as having a single segment 75c which has a C-shape. This C-shaped segment has a diameter that is slightly larger than the diameter of the inside surface of the cup-shaped rotor frame 12a, so that when the spacer 75 is inserted it will press tightly against the inner surface of the rotor frame. In a similar manner, the spacers 73 and 74 may be segmented.

Figure 11:
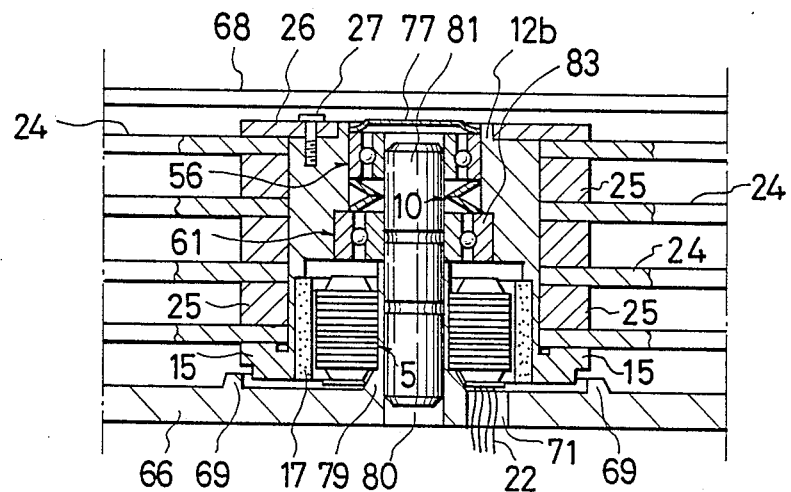
FIG. 11 is a longitudinal sectional view showing a portion of the structure of FIG. 6 wherein another alternate form of the motor shaft is shown.

FIG. 11 shows another embodiment of the motor structure of FIG. 6. In this embodiment, the shaft has a lower portion 79 which contains a central bore 80. The shaft also includes a supporting post 81 which is press fit into the central bore 80, and the upper and lower bearings 56 and 61 are mounted on this supporting post. This embodiment also shows that the rotor frame 12b has an inward step 83 which holds the outer race of the lower bearing 61.

Figure 12:
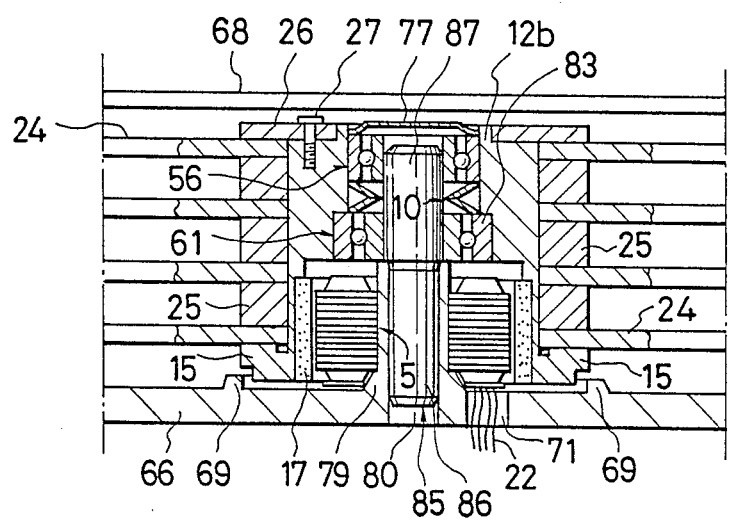
FIG. 12 is a longitudinal sectional view showing a portion of the structure of FIG. 6 wherein a further alternate form of the motor shaft is shown.

FIG. 12 illustrates an alternate embodiment of FIG. 11. In this embodiment the supporting post 85 has a small diameter lower portion 86 and a large diameter upper portion 87. The large diameter portion 87 rests upon the upper surface or end of the lower shaft portion 79 and the small diameter portion 86 is press fit within the bore 80.

Figure 13:
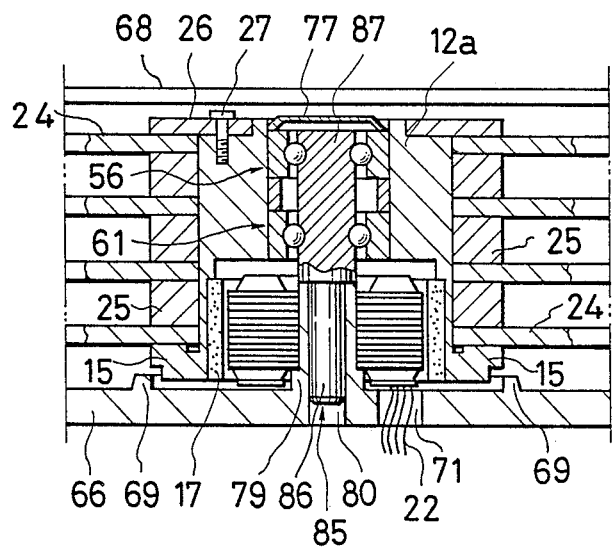
FIG. 13 is a repeat of FIG. 12, but showing an embodiment wherein the inner bearing races are formed in the surface of the motor shaft.
Figure 14:
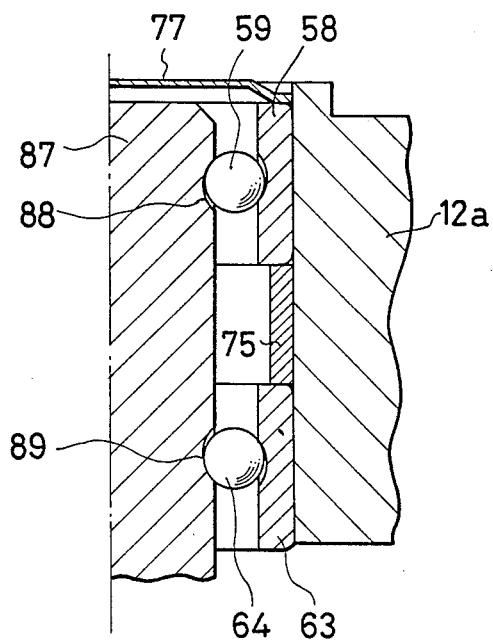
FIG. 14 is an enlarged longitudinal sectional view of a portion of FIG. 13, showing the bearings in greater detail.

FIG. 13 shows an alternate embodiment of the motor of FIG. 12. In this embodiment, the inner race of the upper bearing 56 and the inner race of the lower bearing 61 have been eliminated. The bearing balls are supported in recesses which are contained in the surface of the support post upper portion 87. This is more clearly shown in FIG. 14. The bearing balls 59 of the upper bearing 56 are contained within an upper recess 88 in the large diameter portion 87 of the support post 85. Similarly, the bearing balls 64 of the lower bearing 61 are supported in recess 89 in the outer surface of the large diameter portion 87. Recesses 88, 89 are suitably misaligned in relation to outer races 58, 63 in order to preload the bearings.

Figure 15:
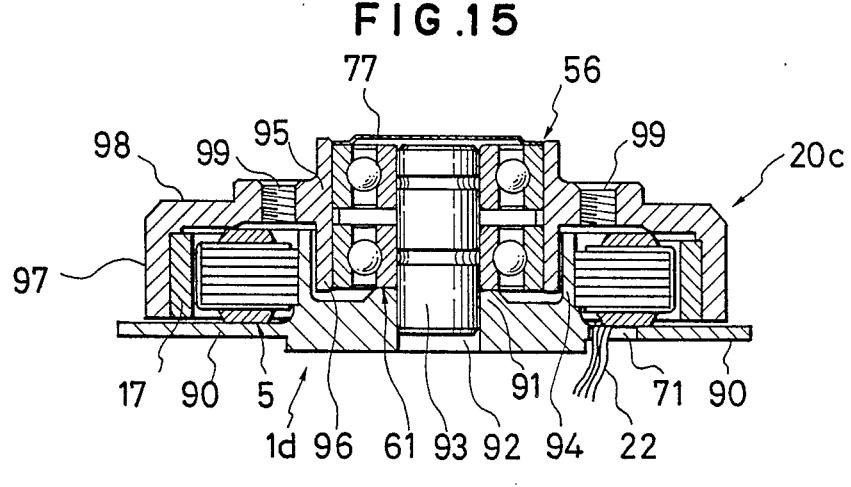
FIG. 15 is a longitudinal sectional view of a still further embodiment of the present invention wherein the motor has a very short axial length.

FIG. 15 is a longitudinal sectional view of another embodiment of the disk drive motor of the present invention wherein the motor has a very short axial length in order to provide for a compact structure. The motor has a bottom frame 1d which has a planar bottom member 90. The planar bottom member 90 contains an aperture 71 through which the lead wires 22 may pass to the armature 5. The shaft of the motor has a lower portion 91 having a central bore 92. The shaft also includes a supporting post 93 which is press fit or adhesively secured within the central bore 92. Lower ball bearing 61 and upper ball bearing 56 are secured to the surface of the supporting post 93. Lower bearing 61 sits upon the end of the shaft lower portion 91 and upper bearing 56 sits upon the spacer 75.

A cup-shaped rotor 20c is mounted on the outer races of the bearings 56 and 61 by means of a hub 95 which includes a depending cylindrical wall portion 96. The rotor also has a depending outer cylindrical wall 97. An upstanding cylindrical wall 94 is provided on the planar bottom member 90. This wall 94 is spaced from and encircles the depending cylindrical wall portion 96 of the rotor hub. The armature 5 is mounted on the outer surface of the upstanding cylindrical wall 94. Depending outer cylindrical wall 97 of the rotor is spaced from and encircles the armature 5. A plurality of permanent magnets is mounted on the inside surface of the outer cylindrical wall 97. The magnets are proximate to and spaced from the armature in magnetic engagement, whereby the rotor 20c rotates about the upstanding shaft and the armature when the armature is electrically energized. Cup-shaped rotor 20c also has a surface 98 which is perpendicular to the motor axis. Surface 98 is adapted to hold a magnetic disk, an optical disk, or a magneto-optical disk. Rotor 20c also has a plurality of threaded bores 99 for receiving screws 27 (not shown) for securing the holddown plate 26 (not shown) which secures a magnetic disk on surface 98.

In light of the foregoing disclosure, further alternative embodiments of the inventive disk drive motor will undoubtedly suggest themselves to those skilled in the art. It is thus intended that the disclosure be taken as illustrative only, and that it not be construed in any limiting sense. Modifications and variations may be resorted to without departing from the spirit and the scope of this invention, and such modifications and variations are considered to be within the purview and the scope of the appended claims.

What is claimed is:

1. A motor, suitable for driving a magnetic disk, an optical disk, or a magneto-optical disk, which comprises:
    a. a frame having a planar bottom member;
    b. an upstanding shaft on said planar bottom member, said upstanding shaft having a large diameter lower portion, an intermediate diameter middle portion and a small diameter upper portion;
    c. an aperture in said planar bottom member;
    d. a core mounted on said upstanding shaft on said middle portion and seated against said lower portion proximate said planar bottom member;
    e. an armature wound on said core and energizable by receiving electrical energy from wires passing to said armature through said aperture;
    f. a pair of spaced apart bearings mounted on said upstanding shaft on said upper portion above said armature;
    g. a cup shaped rotor mounted on said bearings to allow said rotor to rotate about said upstanding shaft and armature, said rotor having a cylindrical open bottom encompassing said armature, and said rotor including disk support means for mounting a disk on said rotor in a plane perpendicular to the axis of said upstanding shaft; and
    h. a plurality of permanent magnets mounted within said cup shaped rotor proximate to and spaced from said armature in magnetic engagement, whereby said rotor rotates about the upstanding shaft and armature when said armature is energized.

2. A motor according to claim 1 wherein said bearings are spaced apart by spring elements.

3. A motor according to claim 2 wherein said spring elements are Belleville springs.

4. A motor according to claim 1 wherein said bearings are spaced apart by an annular spacer.

5. A motor according to claim 4 wherein said annular spacer is an annular ring.

6. A motor according to claim 5 wherein said annular ring comprises an annular segment.

7. A motor according to claim 5 wherein said annular ring comprises a plurality of annular segments.

8. A motor according to claim 4 wherein said annular spacer comprises an annular projection on the inside surface of said cup shaped rotor.

9. A motor according to claim 11 wherein said disk support means comprises an annular projection on the outside of said open bottom of the cup shaped rotor, and said annular projection has an upper surface in a plane perpendicular to the axis of said upstanding shaft.

10. A motor according to claim 9 wherein said rotor has a cylindrical outer surface above said annular projection, whereby a plurality of disks may be mounted on said rotor.

11. A motor, suitable for driving a magnetic disk, an optical disk, or a magneto-optical disk, which comprises:
    a. a frame having a planar bottom member;
    b. an upstanding shaft on said planar bottom member, said upstanding shaft including a lower portion having a central bore and a post having upper and lower portions, said post lower portion being secured within said central bore, and said post upper portion having an outer surface having two spaced apart circumferential recesses for providing bearing inner races;
    c. an aperture in said planar bottom member;
    d. upper and lower spaced apart bearings mounted on said post upper portion and in said recesses proximate said planar bottom member;
    e. a cup shaped rotor having a central hub mounted on said bearings to allow said rotor to rotate about said upstanding shaft, said central hub including a depending cylindrical wall portion mounted on said lower bearing;
    f. an upstanding cylindrical wall on said planar bottom member, spaced from and encircling said depending cylindrical wall portion of said rotor central hub;
    g. a core mounted on the outside surface of said upstanding cylindrical wall;
    h. an armature wound on said core and energizable by receiving electrical energy from wires passing to said armature through said aperture;
    i. a depending outer cylindrical wall on said rotor, spaced from and encircling said armature; and,
    j. a plurality of permanent magnets mounted on the inside surface of said rotor outer cylindrical wall proximate to and spaced from said armature in magnetic engagement, whereby said rotor rotates about said upstanding shaft and armature when said armature is energized.

12. A motor, suitable for driving a magnetic disk, an optical disk, or a magneto-optical disk, which comprises:
    a. a frame having a planar bottom member;
    b. an upstanding shaft on said planar bottom member, said upstanding shaft including a lower portion having a central bore and a post having upper and lower portions, and said post lower portion being secured within said central bore;
    c. an aperture in said planar bottom member;
    d. a core mounted on said upstanding shaft lower portion proximate said planar bottom member;
    e. an armature wound on said core and energizable by receiving electrical energy from wires passing to said armature through said aperture;
    f. a pair of spaced apart bearings mounted on said post upper portion above said armature;
    g. a cup shaped rotor mounted on said bearings to allow said rotor to rotate about said upstanding shaft and armature, said rotor having a cylindrical open bottom encompassing said armature, and said rotor including disk support means for mounting a disk on said rotor in a plane perpendicular to the axis of said upstanding shaft; and h. a plurality of permanent magnets mounted within said cup shaped rotor proximate to and spaced from said armature in magnetic engagement, whereby said rotor rotates about the upstanding shaft and armature when said armature is energized.

13. A motor according to claim 12 wherein said post upper portion has a diameter greater than said post lower portion and said post upper portion is seated against the end of said shaft lower portion.

14. A motor according to claim 12 wherein said post upper portion has an outer surface having recesses providing the inner races of said bearings.

15. A motor according to claim 1 wherein said aperture is located proximate said upstanding shaft.

16. A motor according to claim 1 wherein said permanent magnets are disposed angularly on an inside surface of said rotor so as to present alternate north and south poles in magnetic engagement with said armature.

17. A motor according to claim 1 including at least one side wall in the shape of a segment of a hollow cylinder.

18. A motor, suitable for driving a magnetic disk, an optical disk, or a magneto-optical disk, which comprises:

a. a frame having a planar bottom member;

b. an upstanding shaft on said planar bottom member, said upstanding shaft including a lower portion having a central bore and a post having upper and lower portions, said post upper portion having a diameter greater than said post lower portion, said post lower portion being secured within said central bore, and said post upper portion being seated against the end of said shaft lower portion;

c. an aperture in said planar bottom member;

d. upper and lower spaced apart bearings mounted on said post upper portion proximate said planar bottom member;

e. a cup shaped rotor having a central hub mounted on said bearings to allow said rotor to rotate about said upstanding shaft, said central hub including a depending cylindrical wall portion mounted on said lower bearing;

f. an upstanding cylindrical wall on said planar bottom member, spaced from and encircling said depending cylindrical wall portion of said rotor central hub;

g. a core mounted on the outside surface of said upstanding cylindrical wall;

h. an armature wound on said core and energizable by receiving electrical energy from wires passing to said armature through said aperture;

i. a depending outer cylindrical wall on said rotor, spaced from and encircling said armature; and, j. a plurality of permanent magnets mounted on the inside surface of said rotor outer cylindrical wall proximate to and spaced from said armature in magnetic engagement, whereby said rotor rotates about said upstanding shaft and armature when said armature is energized.

19. A motor according to claim 18 wherein said bearings are spaced apart by spring elements.

20. A motor according to claim 19 wherein said spring elements are Belleville springs.

21. A motor according to claim 18 wherein said bearings are spaced apart by an annular spacer.

22. A motor according to claim 21 wherein said annular spacer is an annular ring.

23. A motor according to claim 22 wherein said annular ring comprises an annular segment.

24. A motor according to claim 22 wherein said annular ring comprises a plurality of annular segments.

25. A motor according to claim 21 wherein said annular spacer comprises an annular projection on the inside surface of said rotor central hub.

26. A motor according to claim 18 wherein said cup shaped rotor includes disk support means for mounting a disk on said rotor in a plane perpendicular to the axis of said upstanding shaft.

27. A motor according to claim 1 wherein said aperture is located proximate said armature.

28. The motor of claim 1 wherein said permanent magnets are disposed angularly on the inside surface of said rotor so as to present alternate north and south poles in magnetic engagement with said armature.

29. A motor according to claim 11 wherein said cup shaped rotor includes disk support means for mounting a disk on said rotor in a plane perpendicular to the axis of said upstanding shaft.

30. A motor according to claim 11 wherein said aperture is located proximate said armature.

31. The motor of claim 11 wherein said permanent magnets are disposed angularly on the inside surface of said rotor so as to present alternate north and south poles in magnetic engagement with said armature.

32. A motor according to claim 12 wherein said bearings are spaced apart by spring elements.

33. A motor according to claim 32 wherein said spring elements are Belleville springs.

34. A motor according to claim 12 wherein said bearings are spaced apart by an annular spacer.

35. A motor according to claim 34 wherein said annular spacer is an annular ring.

36. A motor according to claim 35 wherein said annular ring comprises an annular segment.

37. A motor according to claim 35 wherein said annular ring comprises a plurality of annular segments.

38. A motor according to claim 34 wherein said annular spacer comprises an annular projection on the inside surface of said cup shaped rotor.

39. A motor according to claim 12 wherein said disk support means comprises an annular projection on the outside of said open bottom of the cup shaped rotor, and said annular projection has an upper surface in a plane perpendicular to the axis of said upstanding shaft.

40. A motor according to claim 39 wherein said rotor has a cylindrical outer surface above said annular projection, whereby a plurality of disks may be mounted on said rotor.

41. A motor according to claim 12 wherein said aperture is located proximate said upstanding shaft.

42. A motor according to claim 12 wherein said permanent magnets are disposed angularly on an inside surface of said rotor so as to present alternate north and south poles in magnetic engagement with said armature.

43. A motor according to claim 12 including at least one side wall in the shape of a segment of a hollow cylinder.

44. A motor according to claim 11 wherein said bearings are spaced apart by spring elements.

45. A motor according to claim 44 wherein said spring elements are Belleville springs.

46. A motor according to claim 11 wherein said bearings are spaced apart by an annular spacer.

47. A motor according to claim 46 wherein said annular spacer is an annular ring.

48. A motor according to claim 47 wherein said annular ring comprises an annular segment.

49. A motor according to claim 47 wherein said annular ring comprises a plurality of annular segments.

50. A motor according to claim 46 wherein said annular spacer comprises an annular projection on the inside surface of said rotor central hub.

* * * * *